(No Model.) 2 Sheets—Sheet 1.

C. J. SCHOENING.
FLANGED WHEEL FOR RAILWAYS OR ROADS.

No. 361,027. Patented Apr. 12, 1887.

Witnesses,
N. Rossiter
W. W. Elliott

Inventor:
Chas. J. Schoening (No Model.) 2 Sheets—Sheet 2.
C. J. SCHOENING.
FLANGED WHEEL FOR RAILWAYS OR ROADS.
No. 361,027. Patented Apr. 12, 1887.
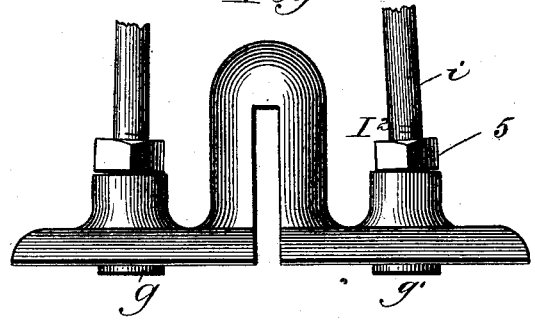
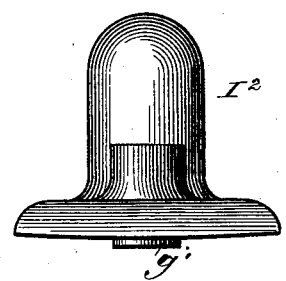
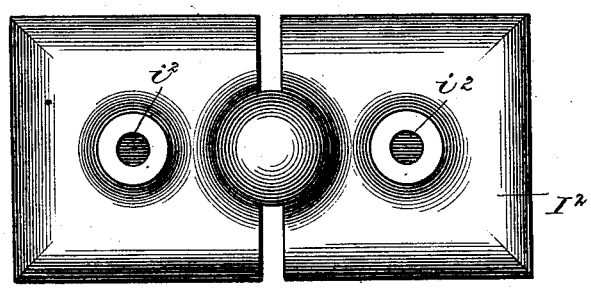
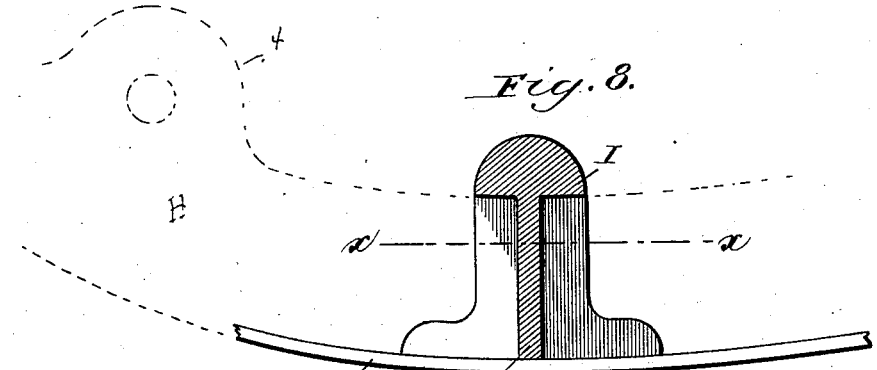
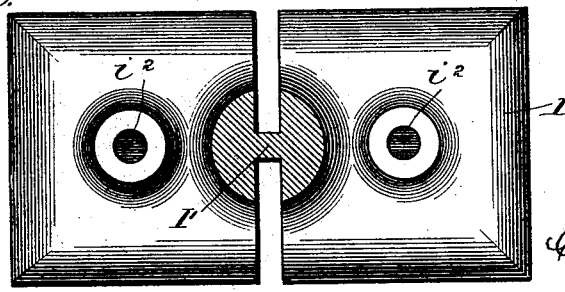
Witnesses.
W. Rossiter
W. W. Elliott
Inventor
Chas. J. Schoening

UNITED STATES PATENT OFFICE.

CHARLES JULIUS SCHOENING, OF CHICAGO, ILLINOIS.

FLANGED WHEEL FOR RAILWAYS OR ROADS.

SPECIFICATION forming part of Letters Patent No. 361,027, dated April 12, 1887.

Application filed September 13, 1886. Serial No. 213,380. (No model.)

*To all whom it may concern:*

Be it known that I, CHARLES J. SCHOENING, of Chicago, in the county of Cook and State of Illinois, have invented a new and useful form of Flange-Wheel for Rail and Road Use, which improvement is fully set forth in the following specification, reference being had to the accompanying drawings.

The object of my invention is to form a wheel that can be used on railroad-track or on an ordinary road or street, said wheel having a shifting flange.

Figure 3:
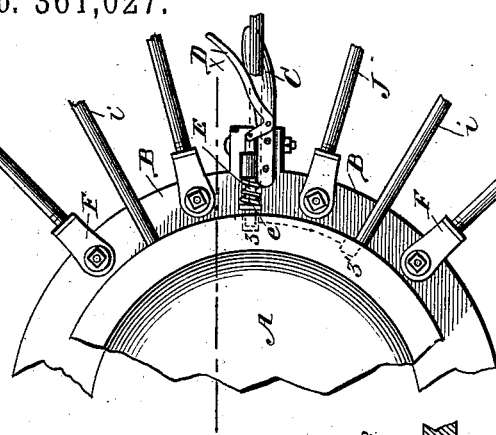
Figure 4:
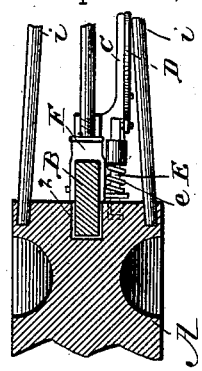
Figure 2:
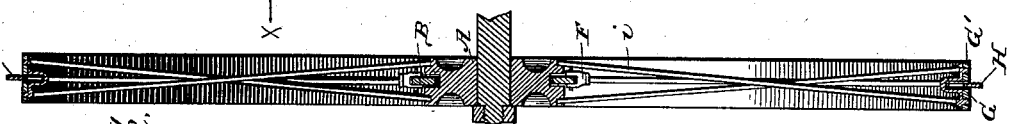
Figure 1:
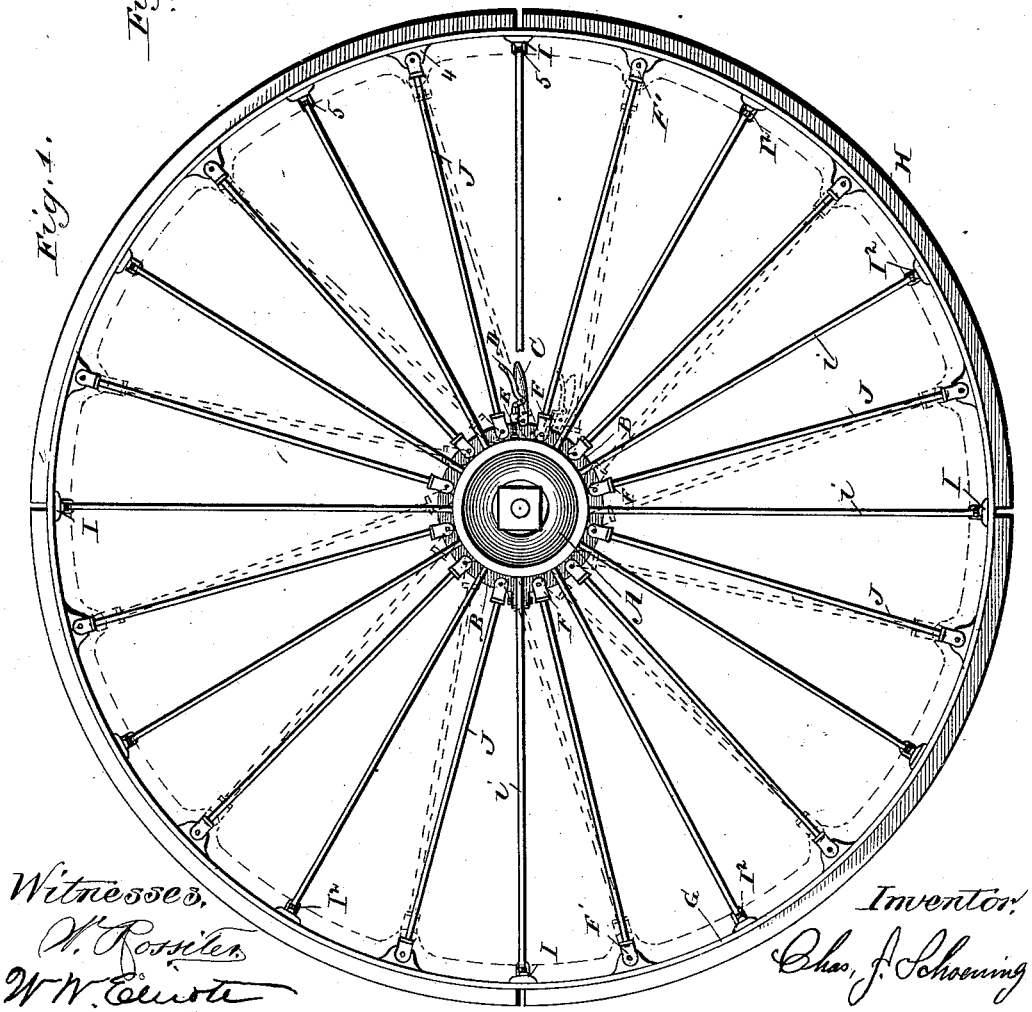

Figure 1 is a side view of my wheel with flange extended, as used for a rail-wheel, the dotted lines showing flange drawn in as it would look when used as a road-wheel. Fig. 2 is a sectional view with flange extended, showing mode of placing spokes and flange-rods. Fig. 3 is a side view of part of hub and flange-disk, showing flange-disk connections and shifting-levers with locking-bolt. Fig. 4 is a sectional view of Fig. 3 on line $x$ $x$, showing guide-groove for flange-disk. Fig. 5 is a side view of tire-shoe and spoke-socket with spoke and jam-nut, also showing tire-lug. Fig. 6 is a front view of tire-shoe, showing but one view of spoke-socket and tire-lug. Fig. 7 is a top view of Fig. 5, with spokes and jam-nuts removed. Fig. 8 is a sectional view of rim-shoe I used at each quarter of wheel, four of these being used to each wheel. Fig. 9 is a top view of Fig. 8 through line $x$ $x$.

A, Fig. 1, is a hub with an annular groove (shown in section in Fig. 4) at 2, into which loosely fits flange-disk B, made in two parts and connected by bolts through ears. (Shown in Fig. 3 enlarged.

C is a shifting-lever rigidly bolted to flange-disk B, having a lever, D, pivoted thereon. Lever D operates a locking-bolt, E, said bolt being pressed downward by spring $e$ through the intermedium of a collar fastened to bolt E. (Shown enlarged in Fig. 3.)

F and F' are shackles into which flange-rods J are screwed.

G and G' are tires or steel bands, being the tread of the wheel.

$g$ and $g'$, Figs. 5 and 6, are lugs, said lugs fitting into corresponding holes in tire G' and G'.

H is a flange, made in four sections, and operated by lever C through shackles F and F' and rods J, flange H having ears 4, Figs. 1 and 8, at suitable intervals, to which shackles F' are fastened by bolts or screws.

I and I² are tire-shoes and spoke-sockets, the same being also used for flange-guides.

I, Figs. 1, 8, and 9, are tire-shoes similar to I², with the addition of a partition, 1', said partition being a guide for the ends of sections of flange H.

$i$, Figs. 1 and 5, are spokes fitting into holes in hub and into sockets $i^2$ of tire-shoe I and I², and made firm with all by jam or lock nut 5.

J are rods, connected by shackles F and F' to flange-disk B and flange-ears 4, respectively.

The operation of the wheel is as follows: When used as a rail-wheel, the flange H is out between tires G and G', permitting the wheel to use either tread of the wheel upon the rail. I also make the wheel with one tread, using the same kind of flange. When it is desirous to use the wheel as a road-wheel on ordinary streets and roads, the levers C and D are grasped, thereby releasing bolt E, then giving the lever a pull, swinging flange-disk B until bolt E catches in hole 3'. This operation throws levers J out of their diametrical position around the hub, as shown in dotted lines, Fig. 1, and away from the tire of wheel. The flange H, being fastened to rods J, is drawn in between tire-shoes I and I², flush with the outside of tread of wheel.

I claim as my invention—

1. A wheel for road and rail use, with a shifting flange connected by rods and levers to a loose disk encircling a hub and working in a suitable groove thereon.

2. A wheel for road and rail use, with a loose disk operated by hand or power lever, and locked by bolt or catch engaging in hole or notch in hub.

3. A wheel for road and rail use, with a tire-shoe having a guiding-groove for shifting flange, and sockets for the insertion of spokes, either by screw or jam nuts.

4. A wheel for road and rail use, with a tire-shoe having projecting lugs for engaging in holes in tire, said lugs holding the tire in place.

5. A wheel for road and rail use, constructed with tire either in one or two sections, said tire being held in place by threaded spokes and jam-nuts against a metal shoe, all combined to operate substantially in the manner and for the purpose herein set forth.

CHARLES JULIUS SCHOENING.

Witnesses:
C. G. FALBORG,
J. W. SCHOENING.